(12) United States Patent
Erla et al.

(10) Patent No.: US 8,768,880 B2
(45) Date of Patent: *Jul. 1, 2014

(54) AUTOMATED DATA ANALYSIS AND TRANSFORMATION

(71) Applicant: International Business Machines Corporation, Armonk, NY (US)

(72) Inventors: Arundhathi Erla, Prakasam (IN); Ritesh K. Gupta, Gachibowli (IN); Madhusmita P. Patil, Kukatpally (IN); Swetha Patil, Bangalore (IN); Ramesh Rajagopalan, Bangalore (IN); Bijo A. Thomas, Thiruvalla (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,009

(22) Filed: Sep. 30, 2013

(65) Prior Publication Data
US 2014/0025625 A1 Jan. 23, 2014

Related U.S. Application Data

(63) Continuation of application No. 13/343,142, filed on Jan. 4, 2012, now Pat. No. 8,577,833.

(51) Int. Cl.
*G06F 17/30* (2006.01)
(52) U.S. Cl.
USPC .......................................... 707/602; 707/698
(58) Field of Classification Search
USPC ................................................ 707/602, 698
See application file for complete search history.

(56) References Cited

U.S. PATENT DOCUMENTS

| | | | | |
|---|---|---|---|---|
| 6,604,110 | B1* | 8/2003 | Savage et al. | 707/602 |
| 6,662,188 | B1 | 12/2003 | Rasmussen et al. | |
| 7,680,828 | B2 | 3/2010 | Gorelik | |
| 7,681,185 | B2* | 3/2010 | Kapoor et al. | 717/140 |
| 7,698,325 | B1* | 4/2010 | Ozekinci et al. | 707/698 |
| 7,716,203 | B2 | 5/2010 | Chouinard et al. | |
| 7,720,804 | B2* | 5/2010 | Fazal et al. | 707/601 |
| 7,761,406 | B2* | 7/2010 | Harken | 707/602 |
| 7,788,213 | B2* | 8/2010 | Friedlander et al. | 707/600 |

(Continued)

FOREIGN PATENT DOCUMENTS

CA 2648210 7/2009

OTHER PUBLICATIONS

ETL Enterprise Data Integration, Commercial ETL Tools; Copyright 2009; Retrieved from the Internet: < URL: http://www.etltools.net/oracle-warehouse-builder.html>; retrieved on Jun. 29, 2011; 3 pages.

(Continued)

*Primary Examiner* — Kim Nguyen
(74) *Attorney, Agent, or Firm* — Schmeiser, Olsen & Watts; John Pivnichny

(57) ABSTRACT

A transformation method and system is provided. The method includes generating a data hub application configured to embed extract, transform, and load (ETL) processes. The data hub application is linked to source tables and target tables. Meta data associated with the source and target tables is transferred from virtual views of the data hub application to an ETL work area of the ETL processes. An ETL job is generated and linked to the data hub application. ETL processes are executed and results are determined.

20 Claims, 22 Drawing Sheets

(56) References Cited

U.S. PATENT DOCUMENTS

| | | | |
|---|---|---|---|
| 7,792,783 B2* | 9/2010 | Friedlander et al. | 707/600 |
| 7,941,397 B2* | 5/2011 | Wilms et al. | 707/602 |
| 8,200,614 B2* | 6/2012 | Syed et al. | 707/602 |
| 2004/0215656 A1 | 10/2004 | Dill et al. | |
| 2007/0067175 A1 | 3/2007 | Fulgham et al. | |
| 2008/0306984 A1 | 12/2008 | Friedlander et al. | |
| 2011/0077973 A1 | 3/2011 | Breitenstein et al. | |
| 2013/0173529 A1 | 7/2013 | Erla et al. | |

OTHER PUBLICATIONS

PS Public Service.CO.UK analysis, opinion, debate; Data integration, analysis and reporting with LSH; Jun. 9, 2006; Retrieved from the Internet: <URL: http://www.publicservice.co.uk/article.asp?publication=European%20Union&id=225&content_name=Health&article=6108>; retrieved on Jun. 29, 2011; 1 page.

Berson et al.; Managing Data in the Data Hub; Retrieved from the Internet: <URL: http://searchsystemschannel.techtarget.com/feature/Managing-Data-in-the-Data-Hub>; retrieved on Jun. 29, 2011; 11 pages.

Berson et al.; Data Management Concerns of MDM-CDI Architecture; Chapter 6 of Master Data Management and Customer Data Integration for a Global Enterprise; McGraw Hill; Apr. 26, 2007, pp. 107-131.

ETL-Tools.Info, Business Intelligence—data warehousing—ETL; Data Masking; Retrieved from the Internet < URL: http://etl-tools.info/en/examples/data-masking.htm>; retrieved on Jun. 29, 2011, 3 pages.

Roger Wolter; Master Data Management (MDM) Hub Architecture; Apr. 2007; Retrieved from the Internet < URL: http://msdn.microsoft.com/en-us/library/bb410798(d=printer).aspx>; retrieved on Jun. 29, 2011, 19 pages.

ETL DataHub; Solution Overview; Retrieved from the Internet: <http://www.etlsolutions.com/pdfs/DataHubOverview.pdf>; retrieved on Jun. 29, 2011; 5 pages.

Jiang et al.; A domain ontology approach in the ETL process of Data Warehousing; IEEE International Conference on E-Business Engineering; Nov. 10-12, 2010; pp. 30-35.

Sen et al., Toward Developing Data Warehousing Process Standards: An Ontology-Based Review of Existing Methodologies, IEEE Transactions on Systems, Man, and Cybernetics-Part C: Applications and Reviews, vol. 37, No. 1, Jan. 2007, pp. 17-31.

Office Action (Mail Date Dec. 3, 2012) for U.S. Appl. No. 13/343,142, filed Jan. 4, 2012; Confirmation No. 1031.

Amendment filed Mar. 4, 2013 in response to Office Action (Mail Date Dec. 3, 2012) for U.S. Appl. No. 13/343,142, filed Jan. 4, 2012; Confirmation No. 1031.

Notice of Allowance (Mail Date Apr. 5, 2013) for U.S. Appl. No. 13/343,142, filed Jan. 4, 2012; Confirmation No. 1031.

Request for Continued Examination submitted Jun. 14, 2013 for U.S. Appl. No. 13/343,142, filed Jan. 4, 2012; Confirmation No. 1031.

Notice of Allowance (Mail Date Jun. 26, 2013) for U.S. Appl. No. 13/343,142, filed Jan. 4, 2012; Confirmation No. 1031.

* cited by examiner

Name Datastage_PGM

Discription

Definition Datastage_PGM Version 1
Blind Break Not Applicable [Launch Settings]
Shared Snapshot Label Current Validation Status Development
Status Installable Ide
Version 1
Version Label

[Install] [Lauch IDE] [Submit] [Update]

▼Hide Object Hierarchy
Level Name         Object Type
1  Test_Datastage         Library Domain
2  Test_Datastage_AA      Aplication Area
3  datastgae_demo         Work Area Definition Properties: Datastage_PGM(Version 1)
Checked Out Status Checked Out [Check In] [Uncheck]
Latest Version Yes              [Upgrade To Latest]
Checked Out By
Version Label
Program Type DS
Development Tool DS Validation Status Development
Status Installable Ide ▼Hide Object Hierarchy
Level Name         Object Type
1  Test_Datastage         Library Domain
2  Test_Datastage_AA      Aplication Area Search and Add Value

| Table Descriptors | Source Code | Parameters | Planned Outputs |

Select Object [Remove] | [Add]
Select All | Select None

| Select | Name Is Target | Name | SAS Name | Mapping Status | Mapping To |
|--------|---------------|------|----------|----------------|------------|
| ☐ T_AE | No | T_AE | T_AE | COMPLETE | Test_Datastage > Test_Datastage_AA > Test_Datastage_WA > T_AE |

| Table Descriptors | Source Code Parameters | Plannet Outputs |

FIG. 5D

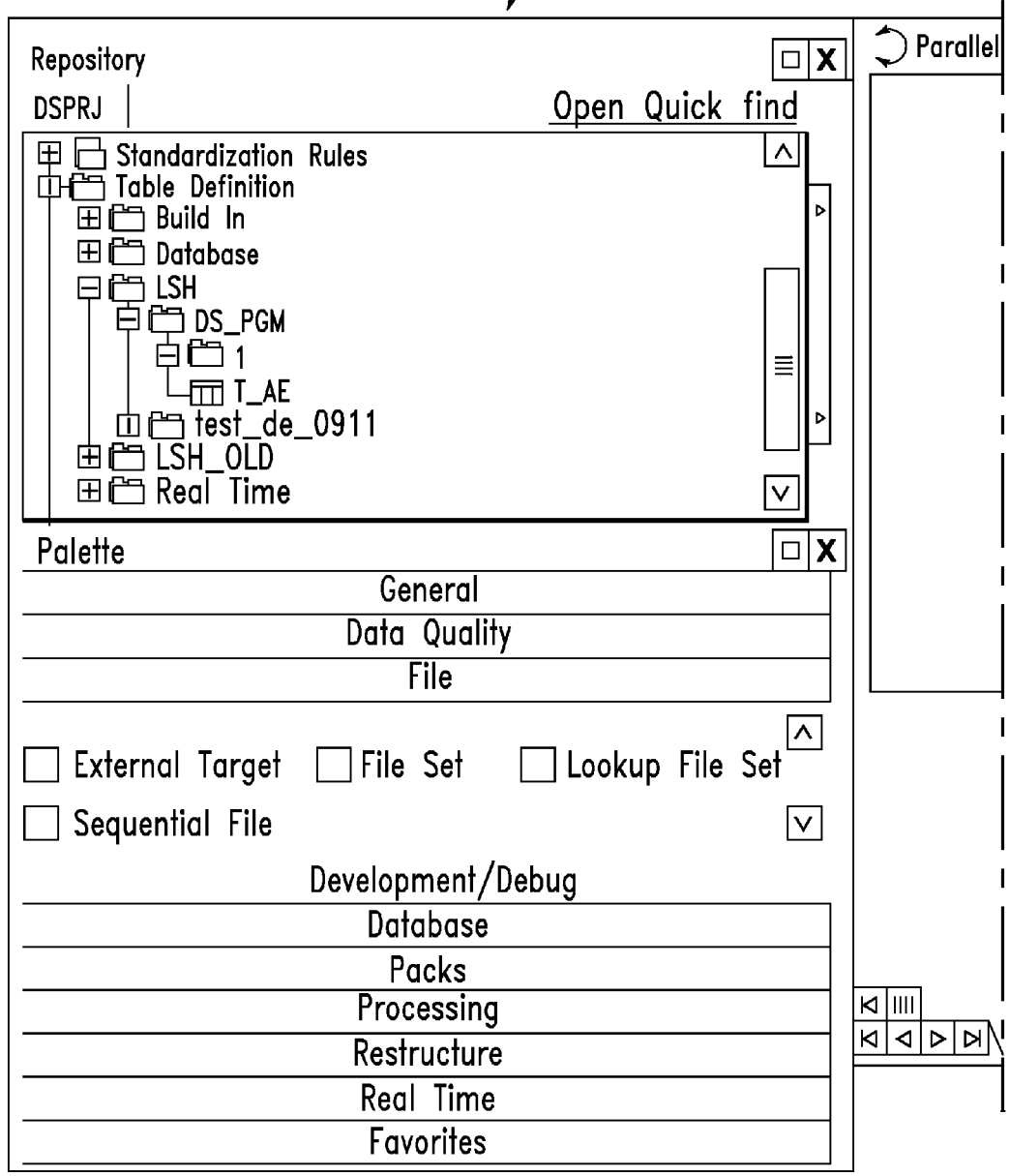
FIG. 5G-A

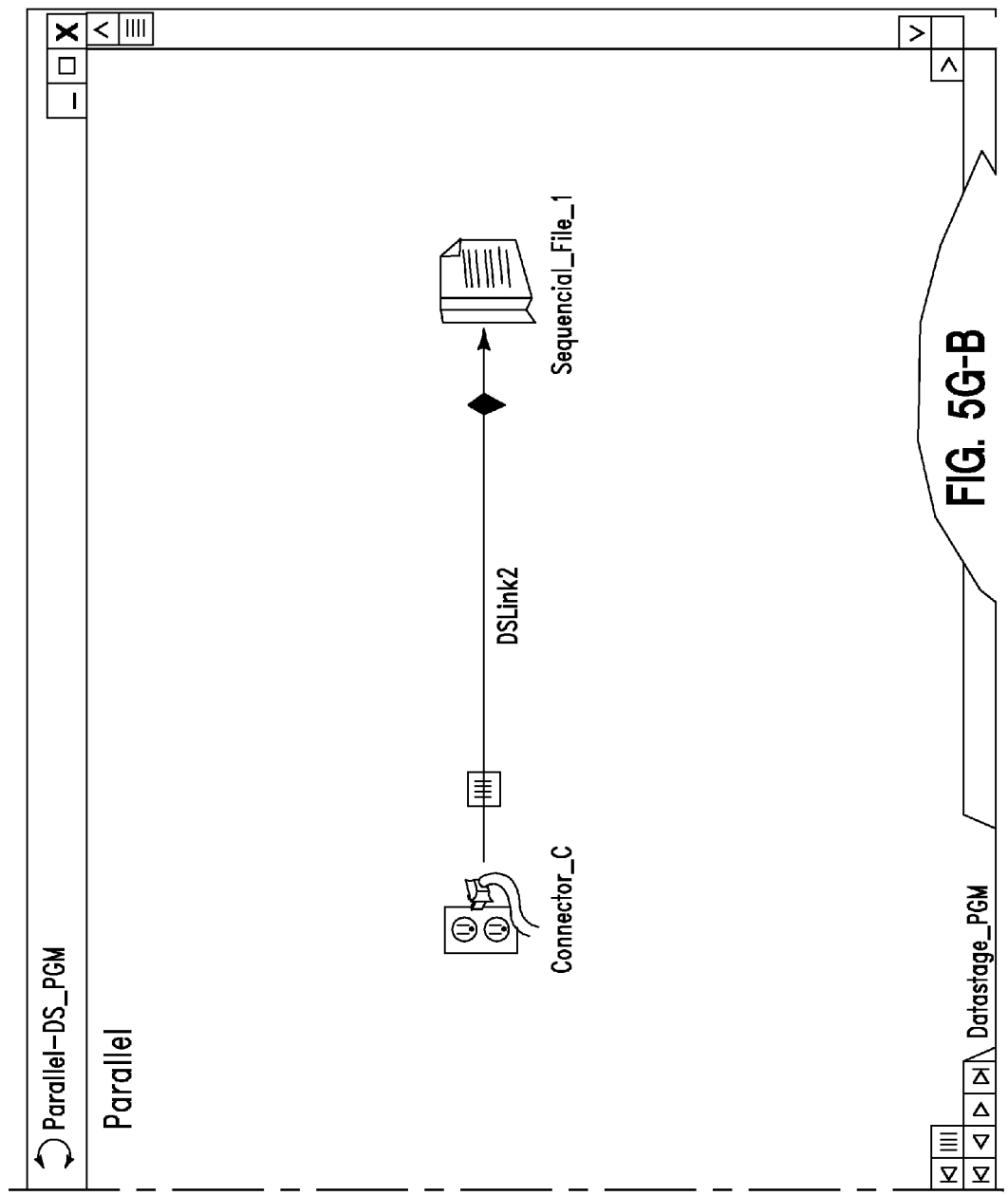
FIG. 5G-B

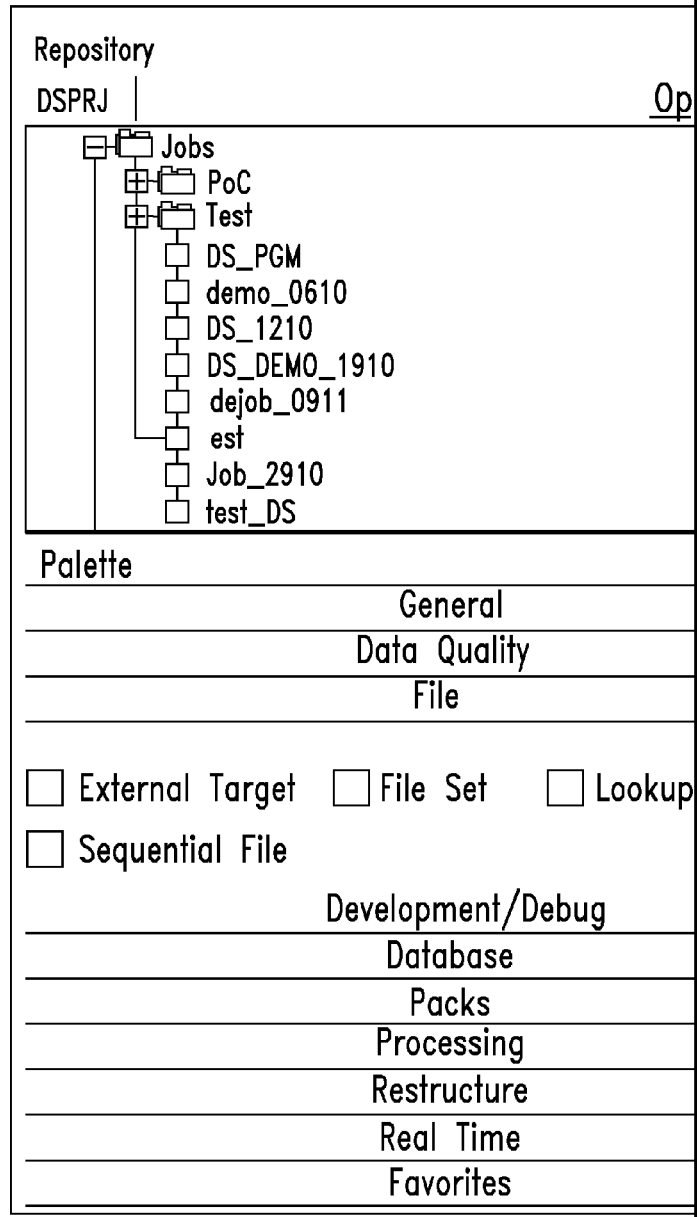
FIG. 5 H-A

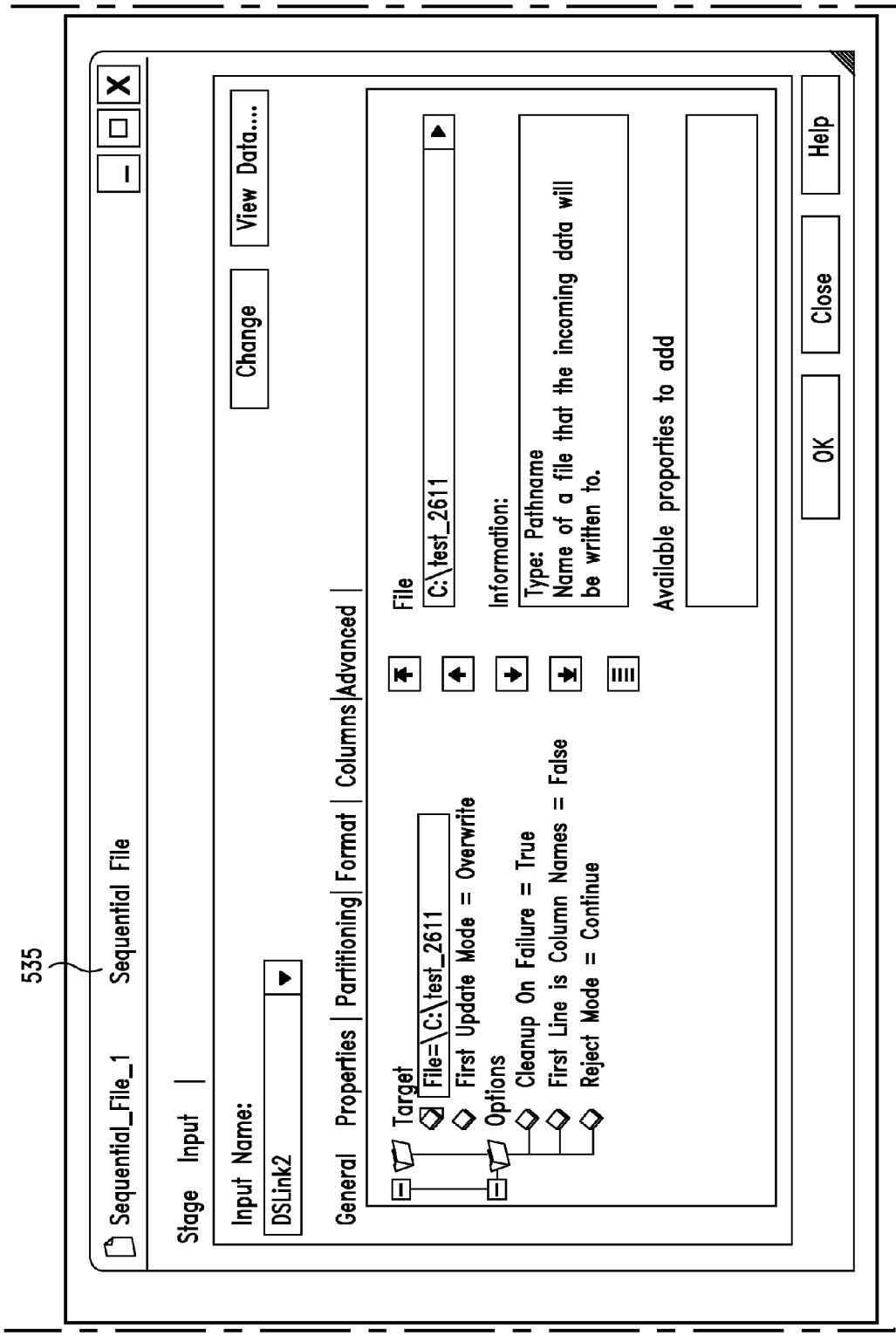
FIG. 5H-B

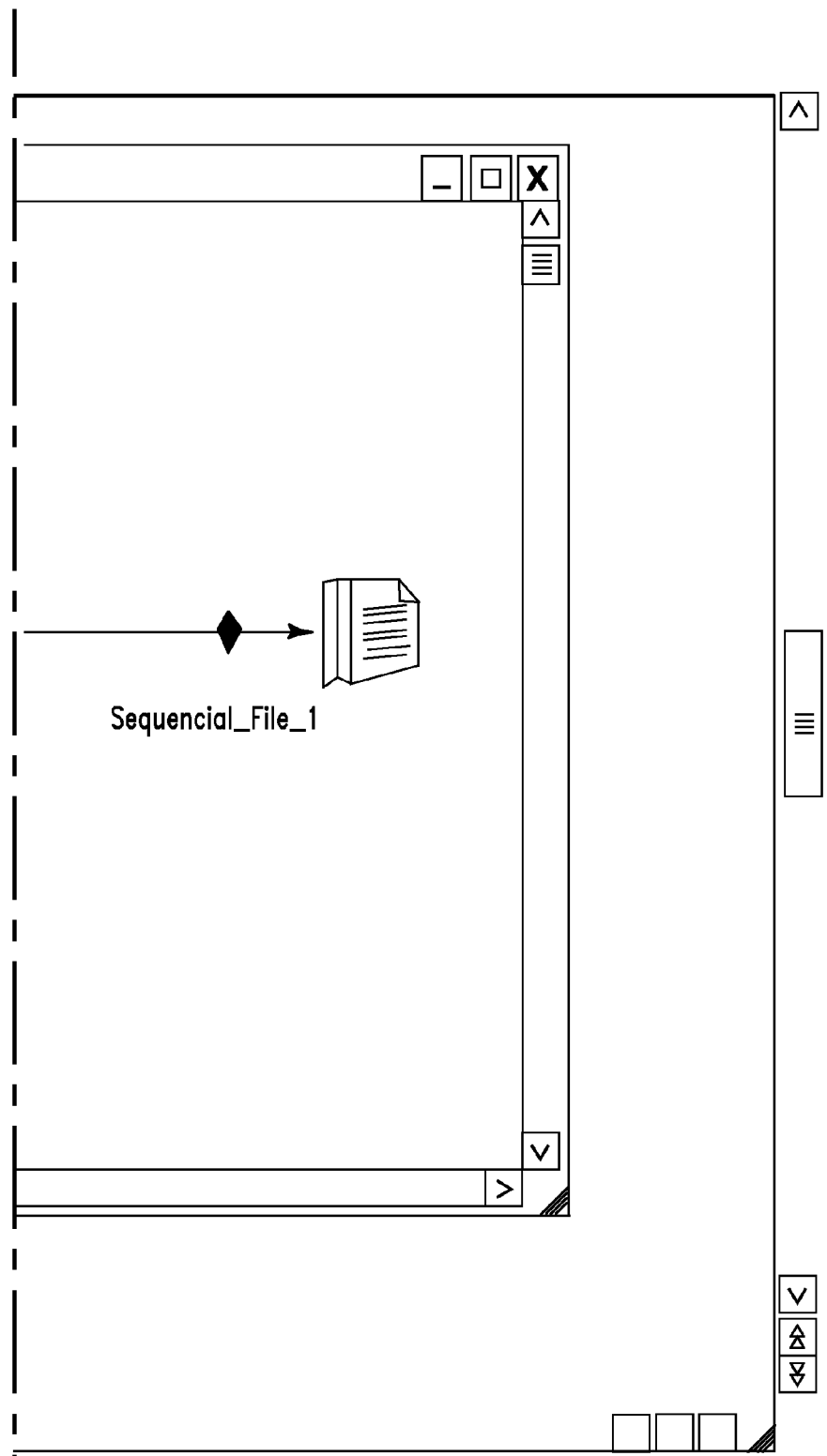
FIG. 5H-C

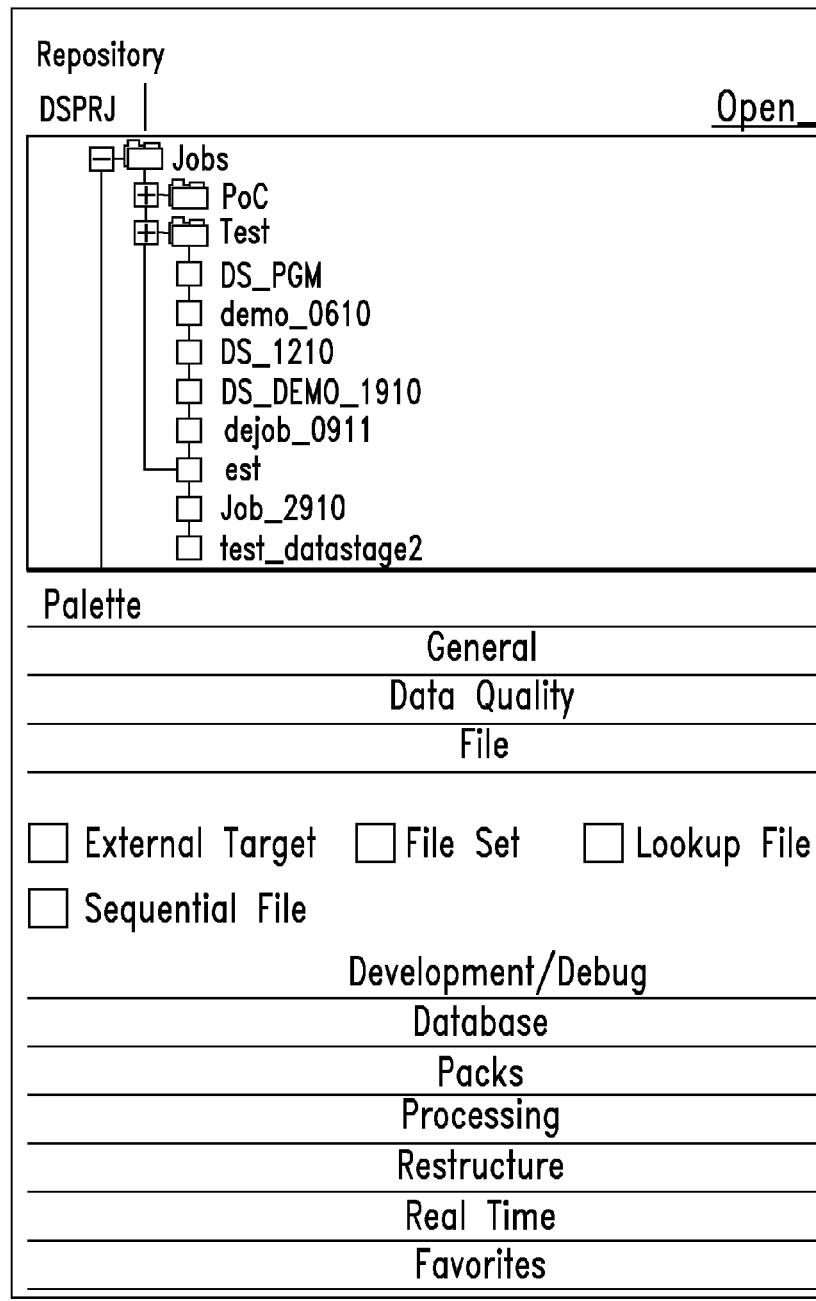
FIG. 5I-A

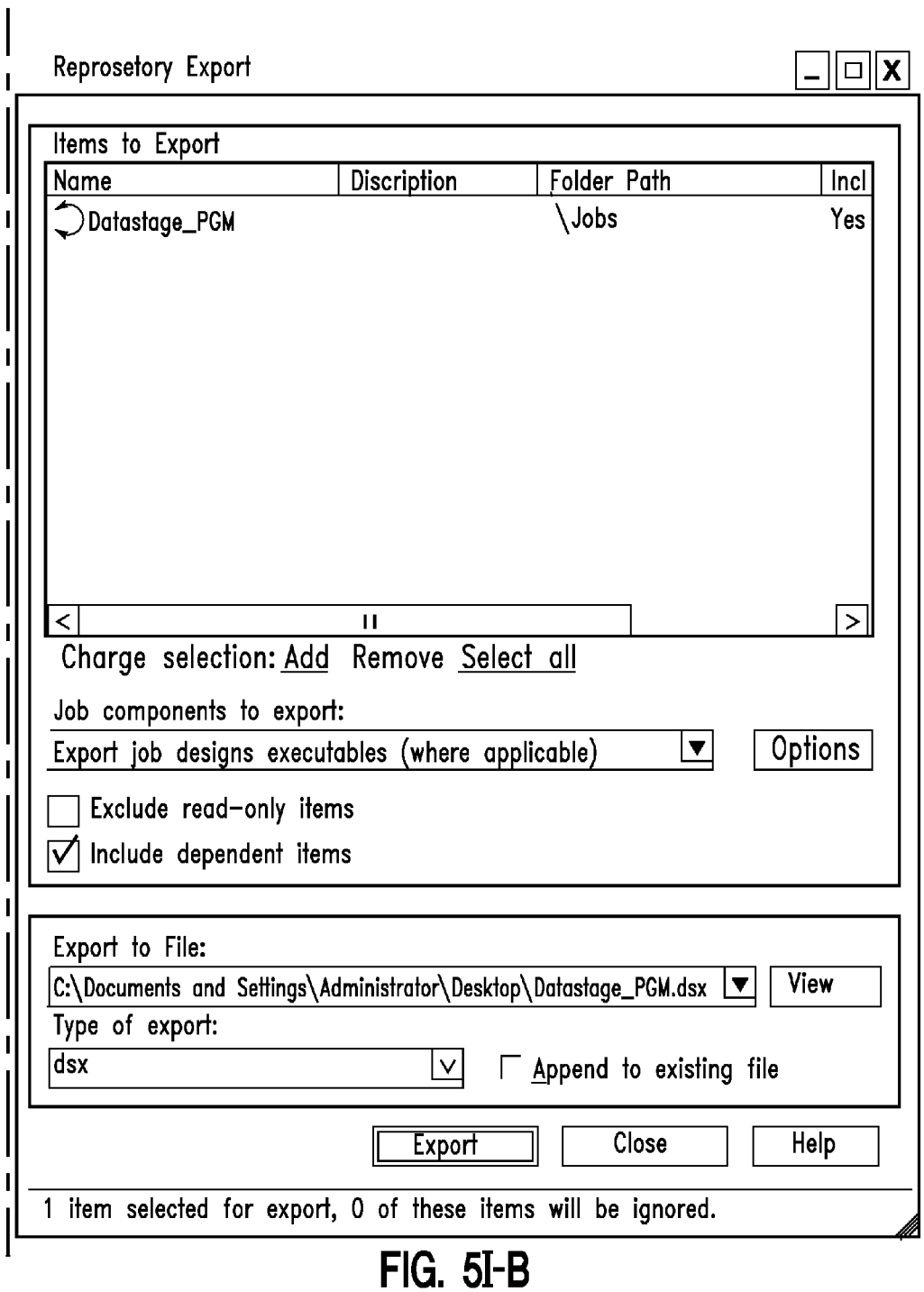
FIG. 5I-B

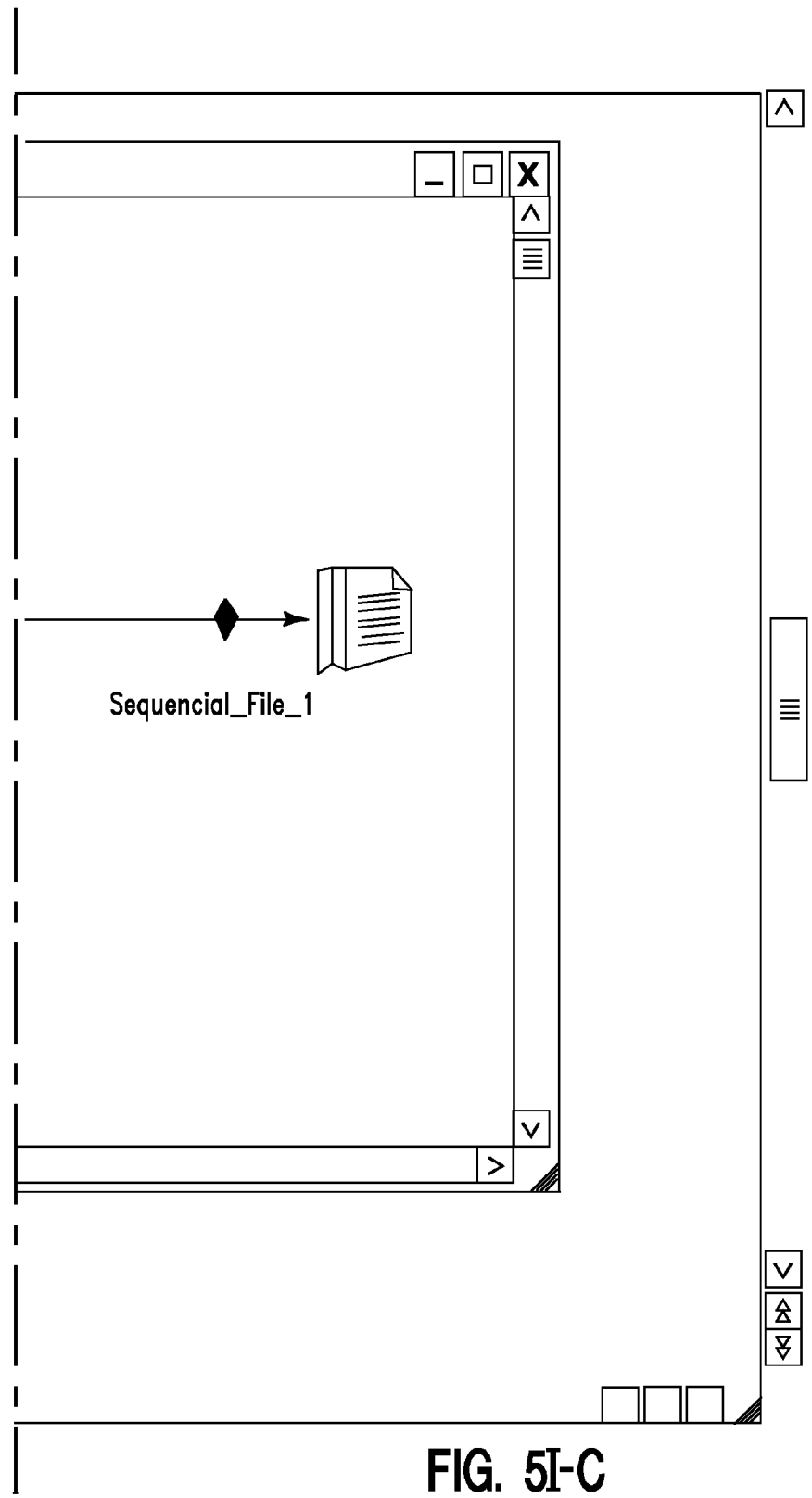
FIG. 5I-C

Applications > Maintain Domain > Domain:Test DataStage > Application Area: Test DataStage AA > Workarea: datastage demo >

Create Source Code

- Indicates required field

540 ⟶

⊙ Create a new Source Code definition and instance

[Cancel] [Apply]

- Name: [test]
- Discription: [        ]

- File Type: [Dsx ∨]
  Sharable: ○ Yes ⊙ No
  ⓘ TIP if your source code file is available please upload here
  Upload File Source Code: [C:\Documents and Settings\Adminis] [Browse]

542 — Submission Details

Execution Priority [Normal ∨]
Submission [Itermediate ∨]
Submission Mode [Full ∨]
Data Currency [Current Immediate Source ∨]
Blind Break [Not Applicable ∨]

Notify on Completion [Never ∨] [Minutes ∨]
Force Execution ⦿No ○Yes [Minutes ∨]
Timeout Value [____] [Minutes ∨]
Apply Snapshot Label [None ∨] Label [____]

[Cancel] [Submit]

Output Suffixes
Output Title Suffix [____]
Output Description Suffix [____] [<] [>]

| Submission Parameters | Source Data Currency | | | |
|---|---|---|---|---|
| Expand All | Collapse All | | | |
| ○ | | | | |
| Focus Prompt | Object Type | Parameter Required ? | Parameter Value | |
| ▼ DS_PGM | Program Instance | | | |
| DS | Parameter Instance | Yes | DS_PGM | |
| Submission Parameters | Source Data Currency | | | |

FIG. 5K

AUTOMATED DATA ANALYSIS AND TRANSFORMATION

RELATED CASES

This application is a continuation application claiming priority to Ser. No. 13/343,142 filed Jan. 4, 2012.

FIELD

The present invention relates to a method and associated system for automating data analysis and transformation within a data hub.

BACKGROUND

Managing and modifying data typically comprises an inaccurate process with little flexibility. Data management and modification within a system typically includes a complicated process that may be time consuming and require a large amount of resources. Accordingly, there exists a need in the art to overcome at least some of the deficiencies and limitations described herein above.

SUMMARY

The present invention provides a method comprising: generating, by a computer processor of a data hub, a data hub application configured to embed extract, transform, and load (ETL) processes; linking, by the computer processor, source tables and target tables to the data hub application; transferring, by the computer processor, metadata associated with the source tables and the target tables from virtual views of the data hub application to an ETL work area of the ETL processes; generating, by the computer processor, an ETL job; linking, by the computer processor, the ETL job to the data hub application; executing, by the computer processor executing a data hub scheduler application, the ETL processes; and determining, by the computer processor, results of the executing.

The present invention provides a data hub comprising a computer processor coupled to a computer-readable memory unit, the memory unit comprising instructions that when executed by the computer processor implements a method comprising: generating, by the computer processor, a data hub application configured to embed extract, transform, and load (ETL) processes; linking, by the computer processor, source tables and target tables to the data hub application; transferring, by the computer processor, metadata associated with the source tables and the target tables from virtual views of the data hub application to an ETL work area of the ETL processes; generating, by the computer processor, an ETL job; linking, by the computer processor, the ETL job to the data hub application; executing, by the computer processor executing a data hub scheduler application, the ETL processes; and determining, by the computer processor, results of the executing.

The present invention provides a computer program product, comprising a computer readable storage device storing a computer readable program code, the computer readable program code comprising an algorithm that when executed by a computer processor of a data hub implements a method, the method comprising: generating, by the computer processor, a data hub application configured to embed extract, transform, and load (ETL) processes; linking, by the computer processor, source tables and target tables to the data hub application; transferring, by the computer processor, metadata associated with the source tables and the target tables from virtual views of the data hub application to an ETL work area of the ETL processes; generating, by the computer processor, an ETL job; linking, by the computer processor, the ETL job to the data hub application; executing, by the computer processor executing a data hub scheduler application, the ETL processes; and determining, by the computer processor, results of the executing.

The present invention advantageously provides a simple method and associated system capable of managing and modifying data.

BRIEF DESCRIPTION OF THE DRAWINGS

FIGS. 5A-5L describe an implementation example for automating data analysis and transformation within a data hub, in accordance with embodiments of the present invention.

DETAILED DESCRIPTION

Figure 1:
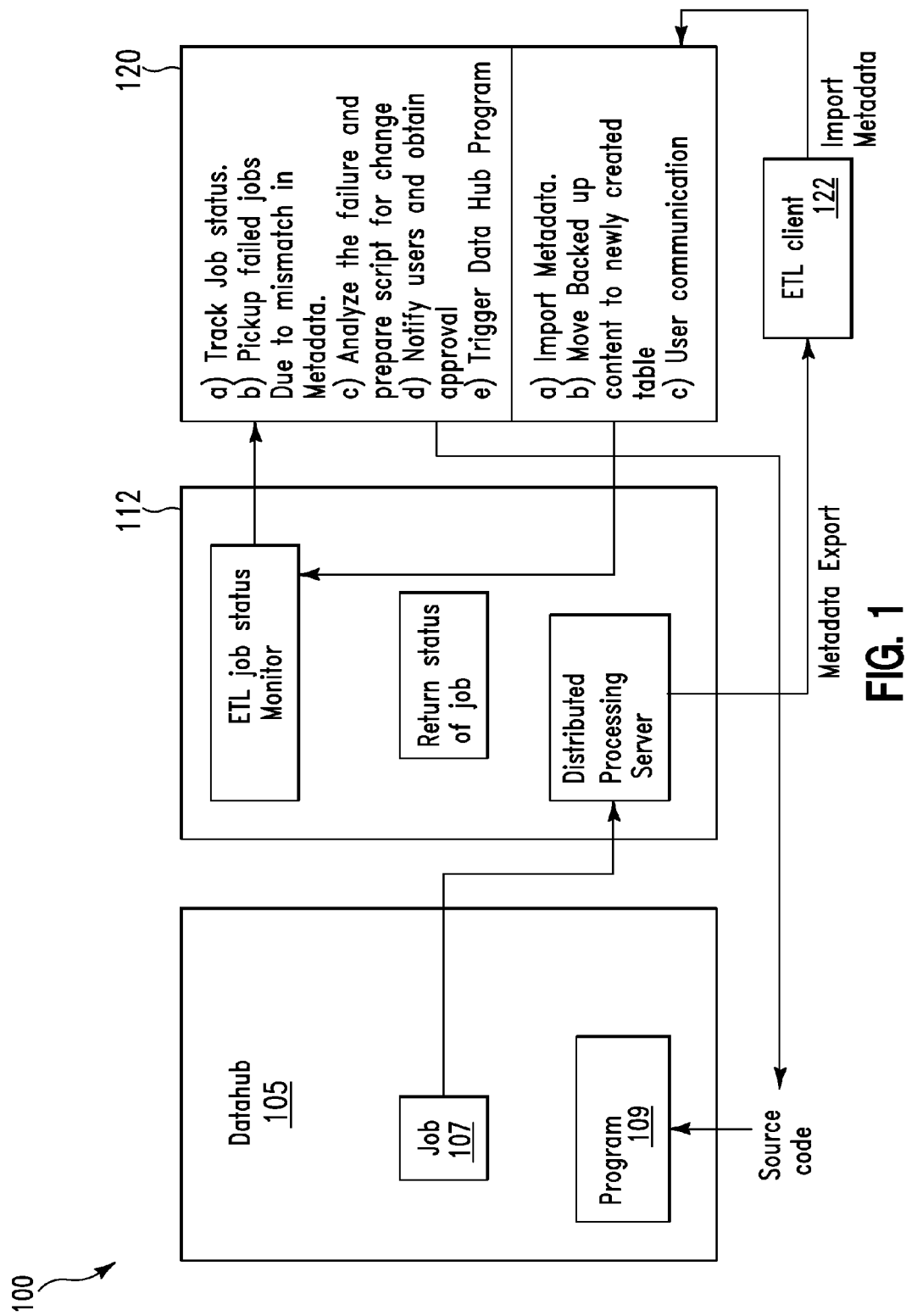
FIG. 1 illustrates a system for automating data analysis and transformation within a data hub, in accordance with embodiments of the present invention.

FIG. 1 illustrates a system 100 for automating data analysis and transformation within a data hub 105, in accordance with embodiments of the present invention. A data hub is defined herein as an enterprise data management device that enables customers to centralize all source systems. Information (within a data hub) flows bi-directionally and may be pushed in one or more directions. A data hub establishes logical independence of front-end consuming business applications and underlying data sources (i.e., back-end systems) that comprise and store data assets. System 100 comprises data hub 105, an extract, transform, and load (ETL) process 112, an ETL repository 120, and an ETL client. An ETL process is defined herein as a process associated with database usage and data warehousing that involves:

1. Extracting data from outside sources.
2. Transforming the data to fit operational needs (e.g., quality levels).
3. Loading the data into an end target (e.g., database or data warehouse).

System 100 performs the following functions:

1. Embedding and managing (automatically) ETL processes 112 within data hub 105. System, 100 detects metadata changes by sensing job failures and determining a reason for the job failures. Metadata is defined herein as data comprising information supporting data. The information may comprise: a means of creation of data, a purpose of the data, a time and date of creation, a creator or author of data, placement on a computer network associated with where the data was created, standards used, basic information (e.g., a digital image may include metadata describing how large the digital image is, a color or depth of the digital image, a resolution of the digital image, a creation time, etc). Metadata may be stored and managed in a database. Upon detection of the metadata changes, system 100 alerts and notifies approved users that the metadata changes have been corrected and will be refreshed automatically. Additionally, system 100 automatically triggers a job within data hub 105 that exports metadata from data hub 105 and imports the metadata to ETL processes 112. Embedding ETL processes 112 within data hub 105 results in avoidance of manual interference. Metadata changes are detected by leveraging ETL processes 112 and determining a reason for failure based on available log data. System 100 generates a data hub program for embedding ETL processes 112.

2. Leveraging a virtual view generated for presenting metadata and data within data hub 105 (i.e., for exporting information from source information). A virtual view enables data to be viewed from different business perspectives. A virtual view may comprise a logical representation of data to cater to a business area. A virtual view allows multiple entities to be aggregated in parallel for retrieving multiple data from data hub 105, simultaneously. A virtual view of metadata and data allows a transform phase to apply a series of rules or functions to extracted data in order to derive data to be loaded within data hub 105. It can support reading of information in parallel from multiple entities.

3. Automatically exporting and updating metadata to an ETL tool (associated with ETL processes 112) from data hub 105 thereby allowing metadata changes to sync with ETL processes 112.

4. ETL processes 112 reading (in parallel) information from multiple entities for aggregating information.

5. Supporting an automated error detection and recovery mechanism within data hub 105 by custom coding. A scheduler may continuously check for failed jobs and analyze log files associated with the failed jobs. After detecting an impacted table or object, a job is triggered to be executed within data hub 105 for extracting updated metadata and import the updated metadata back to ETL processes 112.

6. Supporting an automatic flow of information across layers (of data hub 105) by leveraging ETL workflow capability within data hub 105. For example, a data warehouse within data hub 105 may support analytics and reporting. A workflow may automatically push information into the data warehouse for feeding into reporting tools. Leveraging workflow capability within data hub 105 allows a flow of data between layers as follows: Data hub-ETL tool-Data hub-Reporting tool.

ETL repository performs the following functions:
1. Tracking a job status.
2. Detecting failed jobs based on a metadata mismatch.
3. Analyzing the job failure and generating a change script.
4. Notifying users of the failed jobs.
5. Triggering a data hub application.
6. Importing metadata.
7. Transferring content to a table.

Figure 2:
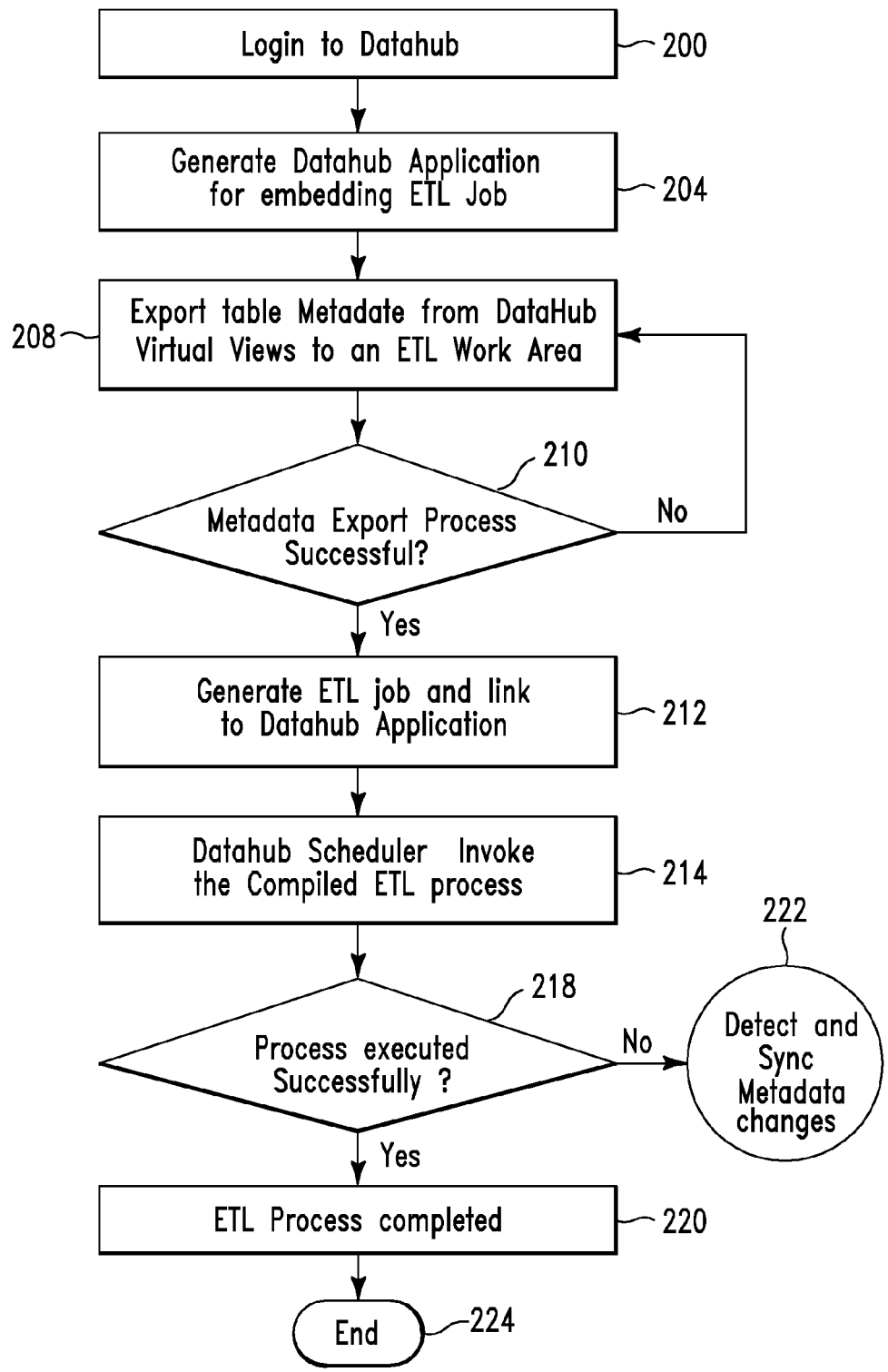
FIG. 2 illustrates an algorithm detailing a process flow enabled by the system of FIG. 1, in accordance with embodiments of the present invention.

FIG. 2 illustrates an algorithm detailing a process flow enabled by system 100 of FIG. 1, in accordance with embodiments of the present invention. In step 200, a user logs into a data hub. In step 204, a computer processor (of a data hub such as data hub 105 of FIG. 1) generates a data hub software application for embedding ETL processes (e.g., ETL processes 112 of FIG. 1). The data hub software application links to source tables and target tables. In step 208, the computer processor exports table metadata from data hub virtual views to an ETL work area. The export process may include:
1. Publishing the data hub software application.
2. Invoking a data hub agent running on an ETL server with data hub information.
3. Passing (from the data hub agent) a data hub identifier to a utility program for exporting metadata to an ETL tool.

In step 210, it is determined if a metadata export process is successful. If in step 210, it is determined that a metadata export process is not successful then step 208 is repeated. If in step 210, it is determined that a metadata export process is successful then in step 212, an ETL job is generated and linked to the data hub application. In step 214, a data hub scheduler invokes compiled ETL processes. The process may include:
1. Submitting the data hub application.
2. Invoking a data hub agent with an ETL job identifier.
3. Invoking an ETL utility with an ETL job identifier and runtime parameters for running an ETL job.

In step 218, it is determined if an ETL process has been executed correctly. If in step 218, it is determined that an ETL process has not been executed correctly then in step 222 metadata changes are detected and synced as described in detail with respect to FIG. 3, infra. If in step 218, it is determined that an ETL process has been executed correctly then in step 220, the ETL process is completed. And the process is terminated in step 224.

Figure 3:
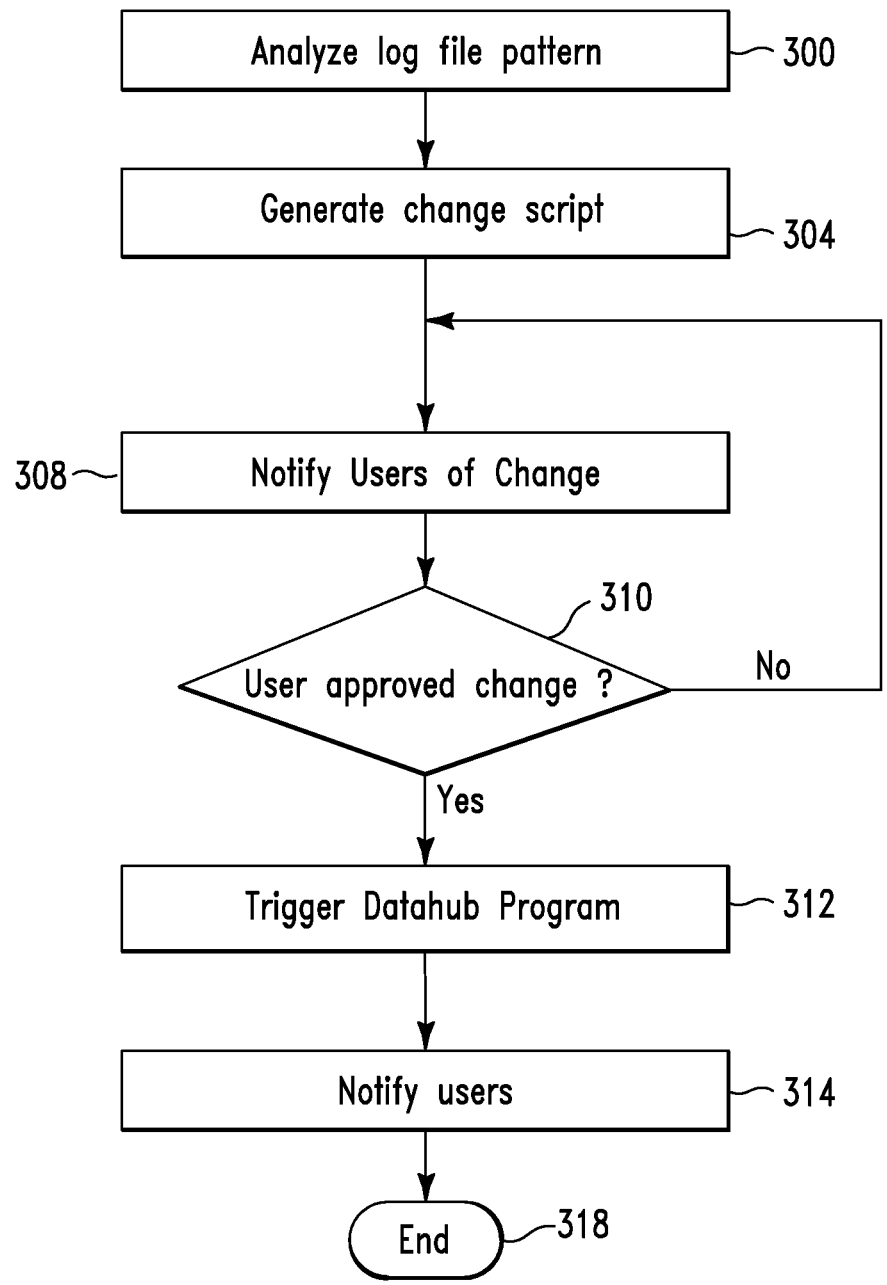
FIG. 3 illustrates an algorithm detailing a step of the algorithm of FIG. 2, in accordance with embodiments of the present invention.

FIG. 3 illustrates an algorithm detailing step 222 of the algorithm of FIG. 2, in accordance with embodiments of the present invention. In step 300, a log file pattern is analyzed to determine a reason for failure of the process of step 218 of FIG. 2. In step 304, a change script is generated based on a category of the failure. The change script includes an exception routine for non-classified categories. In step 308, approved users are notified of a change associated with the change script. In step 310, it is determined if a user has approved the change. If in step 310, it is determined that a user has not approved the change then step 308 is repeated to notify additional users. If in step 310, it is determined that a user has approved the change then in step 312, the data hub software application is triggered with the change script to update the metadata. In step 314, the user(s) is notified that the metadata has been updated and the process is terminated in step 318.

Figure 4:
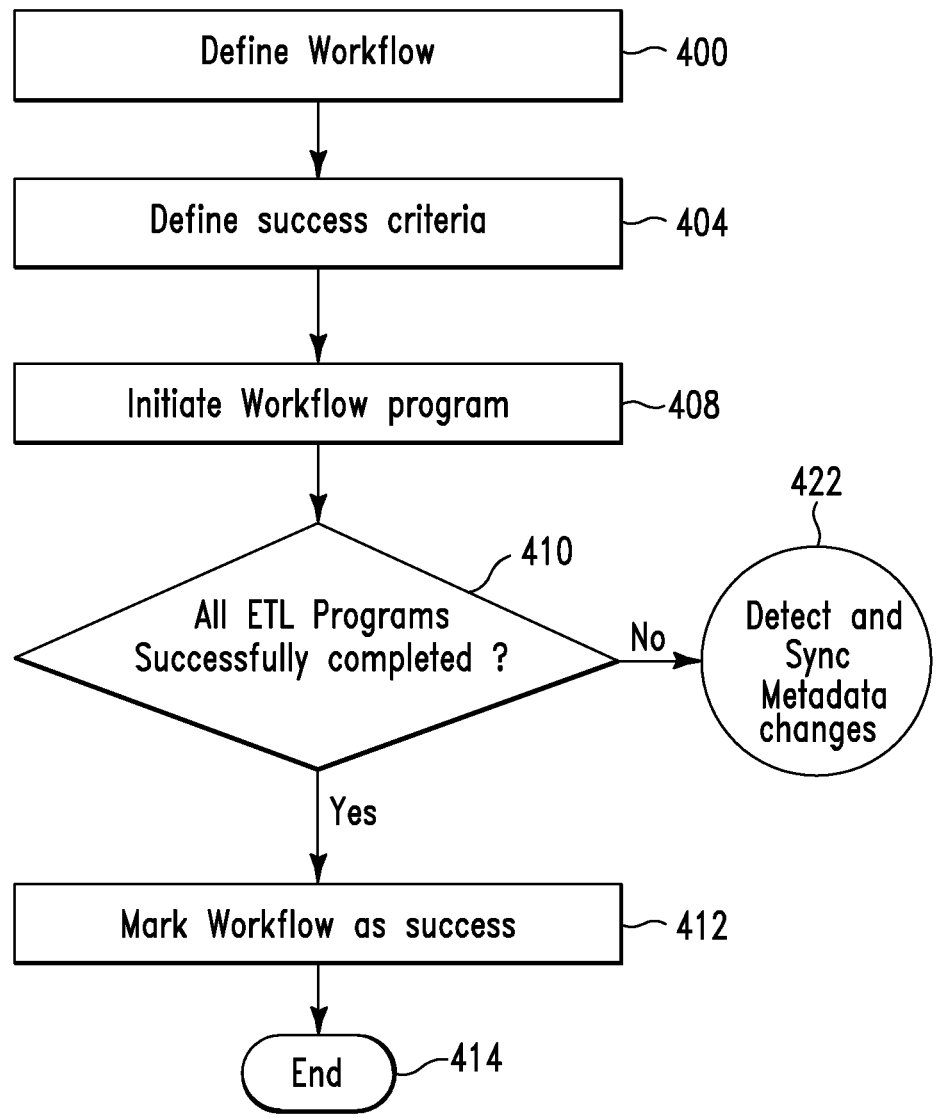
FIG. 4 illustrates an algorithm detailing a process flow enabled by the system 100 of FIG. 1 for managing a work flow within a data hub, in accordance with embodiments of the present invention.

FIG. 4 illustrates an algorithm detailing a process flow enabled by system 100 of FIG. 1 for managing a work flow within a data hub, in accordance with embodiments of the present invention. A workflow is defined herein as a sequence of connected steps, operations, group of persons, etc. In step 400, a workflow comprising multiple data hub software applications is defined. In step 404, a success criterion for the workflow is defined. In step 408, a workflow program (for the workflow) is initiated. In step 410, it is determined if all ETL programs have been successfully completed. If in step 410, it is determined that all ETL programs have not been successfully completed then in step 422, metadata changes are detected and synced as described in detail with respect to FIG. 3, supra. If in step 410, it is determined that all ETL programs have been successfully completed then in step 412 the workflow is marked as a success and the process is terminated in step 414.

FIGS. 5A-5L describe an implementation example comprising a system 500 for automating data analysis and transformation within a data hub, in accordance with embodiments of the present invention. The implementation example described by FIGS. 5A-5L is associated with a pharmaceutical industry.

Figure 5A:
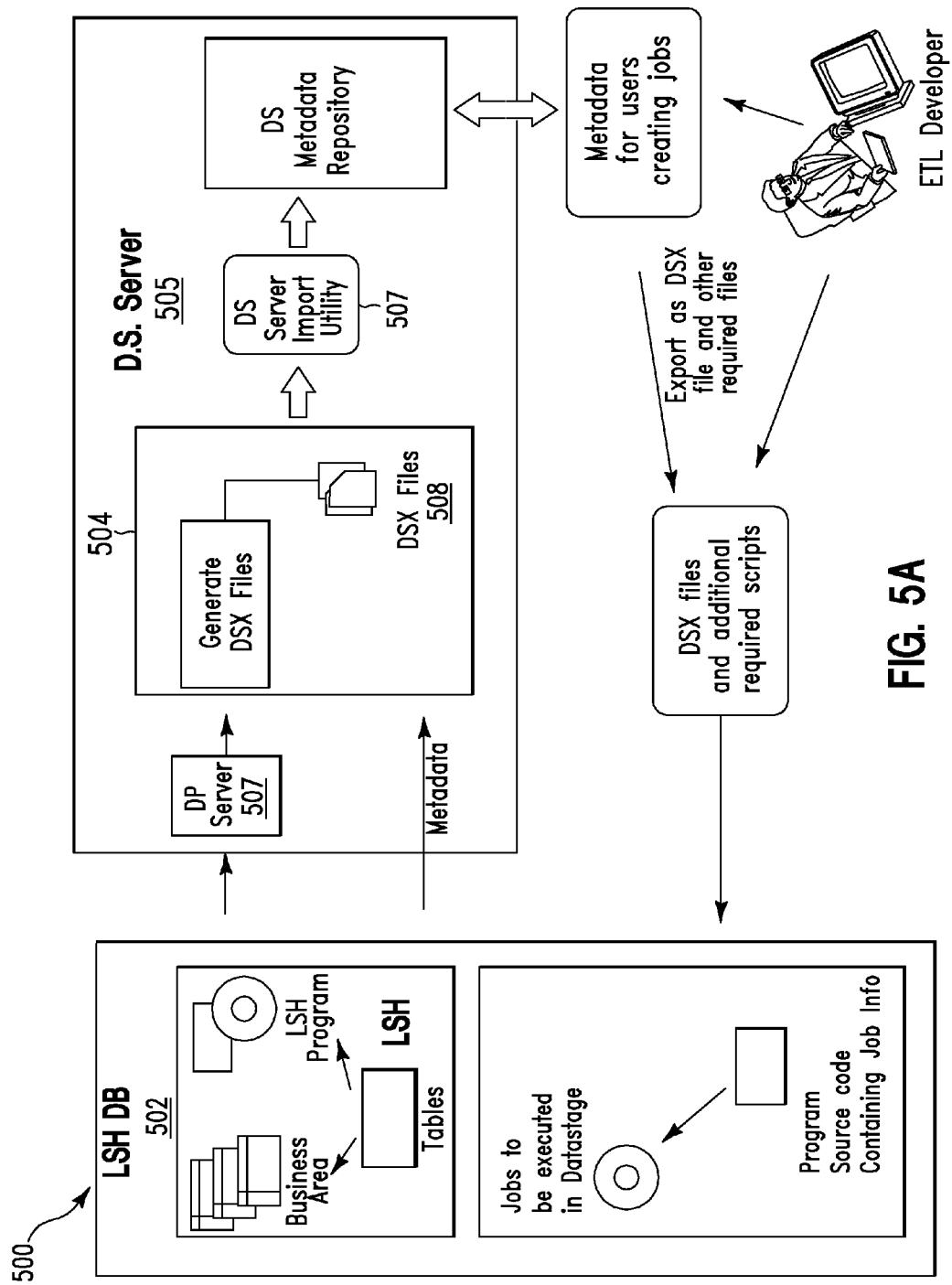

FIG. 5A illustrates a system 500 comprising a local sensitive hashing (LSH) database 502 connected to a DS server 505. LSH database 502 enables the following user actions:

1. Generating an LSH Program (comprising a DS type corresponding to a DS job).
2. Associating required source tables and target tables to the LSH program. The tables requires access by the DS job.
3. Launching a DS designer client.

The following background actions are enabled by system 500:
1. Connecting to a DP server 507.
2. Executing a Java program 504 for exporting LSH program metadata to DSX files 508.
3. Calling a DS server utility 509 for passing the DSX files 508 as input to import the metadata to DS table definitions.

A DS designer performs the following actions:
1. Refreshing table definitions in a DS designer client (i.e., loading imported table definitions to a view).
2. Designing DS jobs for connecting to the tables imported from LSH database 502. The tables defined in LSH database 502 as source tables may be used to be read from. The tables defined in LSH database 502 as target tables can be used to write into. A Database schema name, username, and password (to connect to the Database) are defined as runtime parameters in DS jobs.
3. Compiling a job.
4. Export a DS job as a DSX file.
5. Copying the DSX file to a common location.

A LSH user performs the following actions:
1. Uploading copied DSX file content in the LSH Program as source code.

Figure 5B:
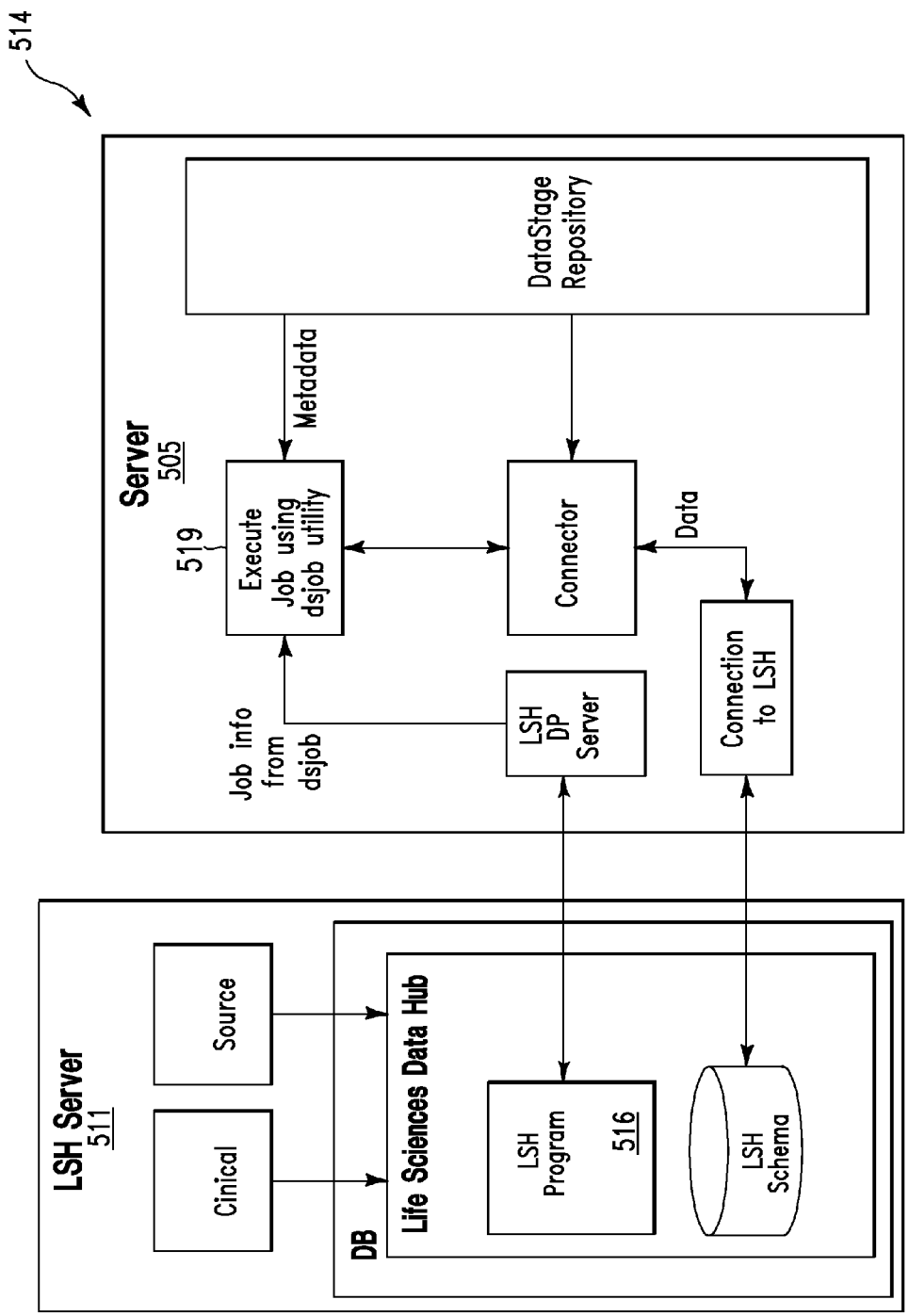

FIG. 5B illustrates a system 514 comprising a local sensitive hashing (LSH) server 511 connected to a DS server 505. LSH server 511 enables the following user actions:
1. Locating and submitting an LSH program 516 corresponding to a DS job designed during a design time.

The following background actions are enabled by system 514:
1. Generating a dynamic schema with tables associated with LSH program 516. Temporary credentials are created to connect to the dynamic schema.
2. Connecting to a DP Server that passes the dynamic schema, temporary credentials, a job name, etc.
3. Retrieving a job name from a DSX file.
4. Executing a dsjob utility 519 that passes runtime parameters to dsjob utility 519 with an output redirected to a file.
5. Checking an output status of a job.
6. Storing a log file job status as success/failed depending on an actual status.

Figure 5C:
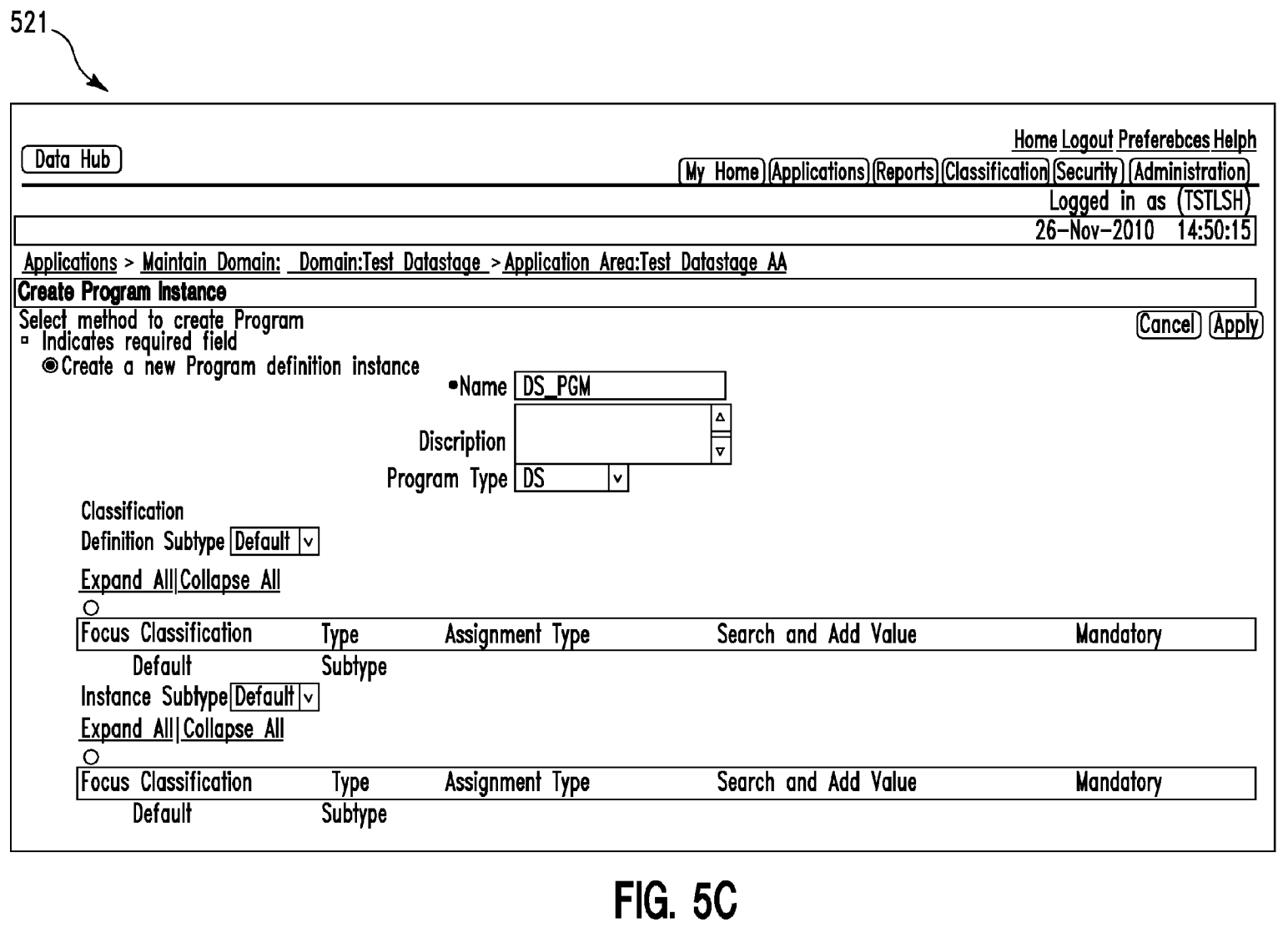

FIG. 5C illustrates a screen shot 521 associated with the implementation example described with respect to FIGS. 5A-5L. Screen shot 521 is associated with execution of step 205 of FIG. 2. When a user logs into an LSH application, the user may browse through three types of nested containers: a domain area, an application area, and a work area. Under the work area, the user has an option to create an LSH Program of program type: DS. DS comprises an ETL tool. The program type DS signifies that the LSH Program configuration is pointing to a DS job.

FIG. 5D illustrates a screen shot 522 associated with the implementation example described with respect to FIGS. 5A-5K. Screen shot 522 is associated with execution of step 208 of FIG. 2. Screen shot 522 illustrates program definition and instance properties of a program (LSH application). The LSH program comprises a capability for associating necessary table descriptors to the program. Table definition metadata is published to the DS tool comprising. source tables and target tables. Screen shot 522 illustrates table T_AE (i.e., clinical adverse event) added to the LSH program comprising a target flag set to No. The table T_AE is configured as source table for the LSH program. A source code button is used to store DS job design.

Figure 5E:
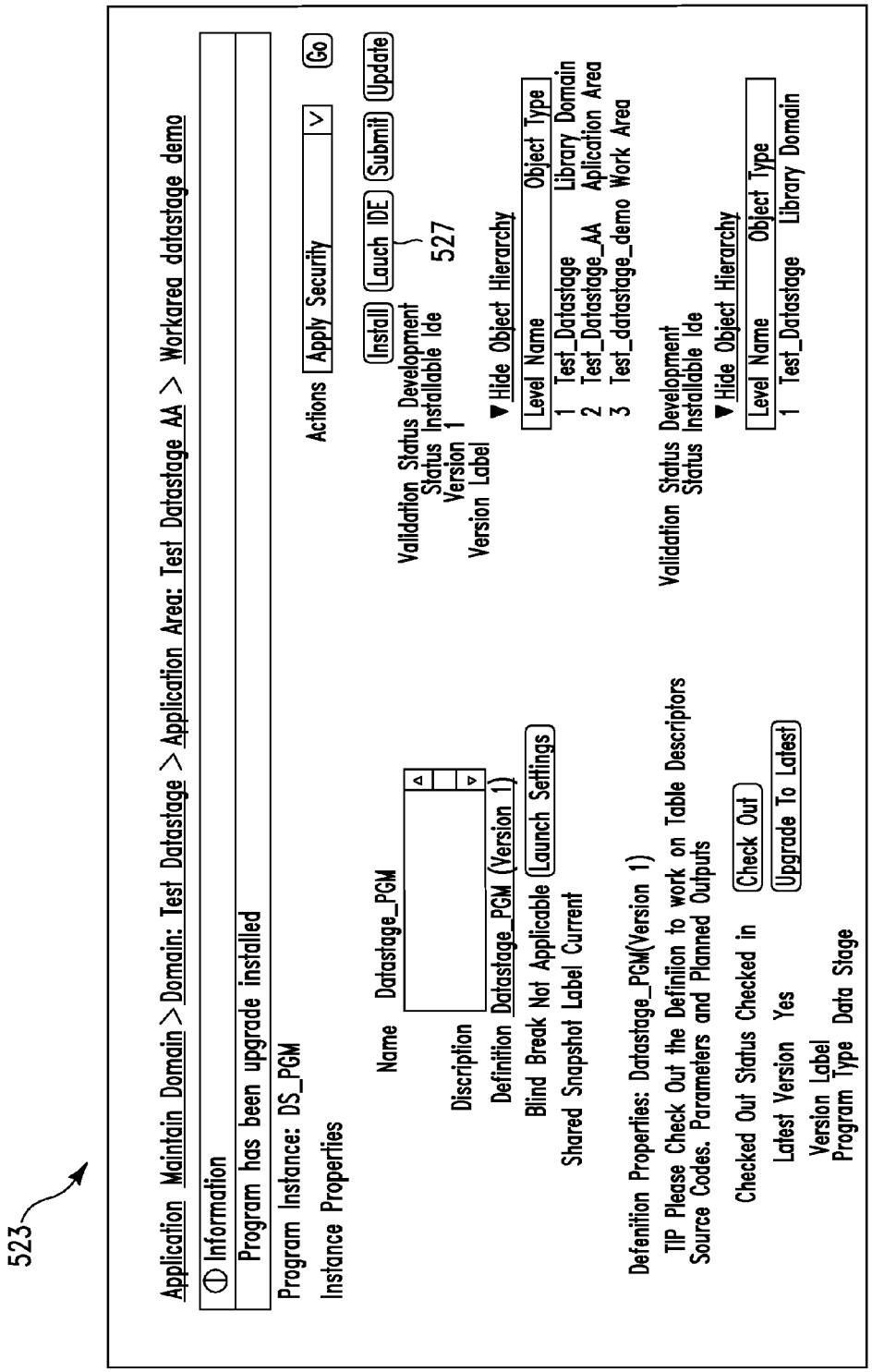

FIG. 5E illustrates a screen shot 523 associated with the implementation example described with respect to FIGS. 5A-5L. In screen shot 523 (i.e., once the LSH program is configured), a user installs the LSH program for compiling underlying objects in LSH. The installed LSH program is ready to be launched. The user will click on a launch IDE button 527 in order to launch a DS designer. LSH metadata will be published to a DS Metadata repository.

Figure 5F:
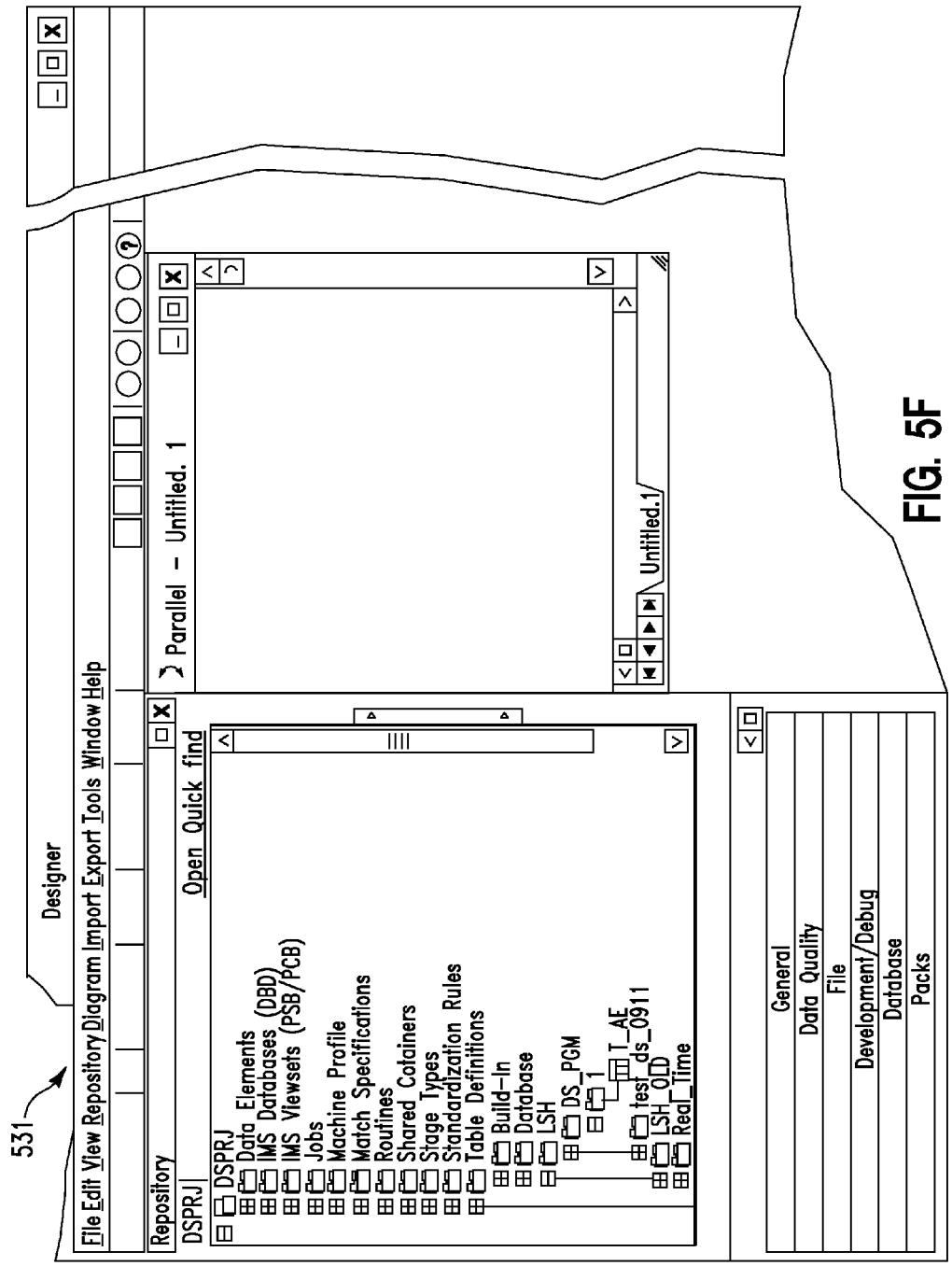

FIG. 5F illustrates a screen shot 531 associated with the implementation example described with respect to FIGS. 5A-5L. In screen shot 531 (as the user clicks on a Launch IDE button in the LSH program), a DS designer is launched with metadata of the table T_AE imported from the LSH program. The DS designer comprises a design interface to create DS jobs. The user may design a job to extract data from LSH, transform the data as per a requirement, and load the data into another DS (e.g., a sequential file/database table).

FIG. 5G, including FIGS. 5G-A and 5G-B, illustrate a screen shot 534 associated with the implementation example described with respect to FIGS. 5A-5L. Screen shot 534 enables a process for creating a sample job in a DS ETL tool to write data from the T_AE table from LSH into a sequential file. The job as designed comprises a connector linked to a sequential file. The DS job uses the connector to connect to tables imported from LSH. The tables defined in LSH as source tables may be used to be read from. A database schema name, username, and password used to connect to the database are defined as runtime parameters in DS jobs.

FIG. 5H, including FIGS. 5H-A, 5H-B, and 5H-C, illustrate a screen shot 534a associated with the implementation example described with respect to FIGS. 5A-5L. Screen shot 534a comprises an additional (sequential file properties) screen 535. Screen 535 illustrates a path for saving the file in a server machine. The file will hold all processed data of the LSH table T_AE defined in the LSH program when the DS job is run.

FIG. 5I, including FIGS. 5I-A, 5I-B, and 5I-C, illustrate a screen shot 538 associated with the implementation example described with respect to FIGS. 5A-5L. Screen shot 538 comprises an additional screen 538a. After a job design is complete, the DS job is compiled and a dsx file is created when a user uses a DS manager to export jobs. The dsx file comprises a job design used to submit the DS job from an outside DS designer. The dsx file is exported to a local machine.

FIG. 5J illustrates a screen shot 540 associated with the implementation example described with respect to FIGS. 5A-5L. Screen shot 540 comprises a dsx file being used as source code for the LSH program. A user may log into an LSH application to browse to the LSH program defined earlier and may checkout the installed LSH. A source code tab may be used to create a new source code as illustrated, supra, in FIG. 5I. A user may browse the dsx file stored in a local machine or paste the contents of a dsx file directly in the source code region resulting in the installation of an LSH program which will compile objects.

FIG. 5K illustrates a screen shot 542 associated with the implementation example described with respect to FIGS. 5A-5L. Screen shot 542 allows a user to submit the LSH program. A DS job execution will be initiated in the LSH and a job name will be retrieved from the dsx file which will be transferred from an LSH Server to DS Server. A DP (distributed processing) server communicates with the DS server.

Figure 5L:
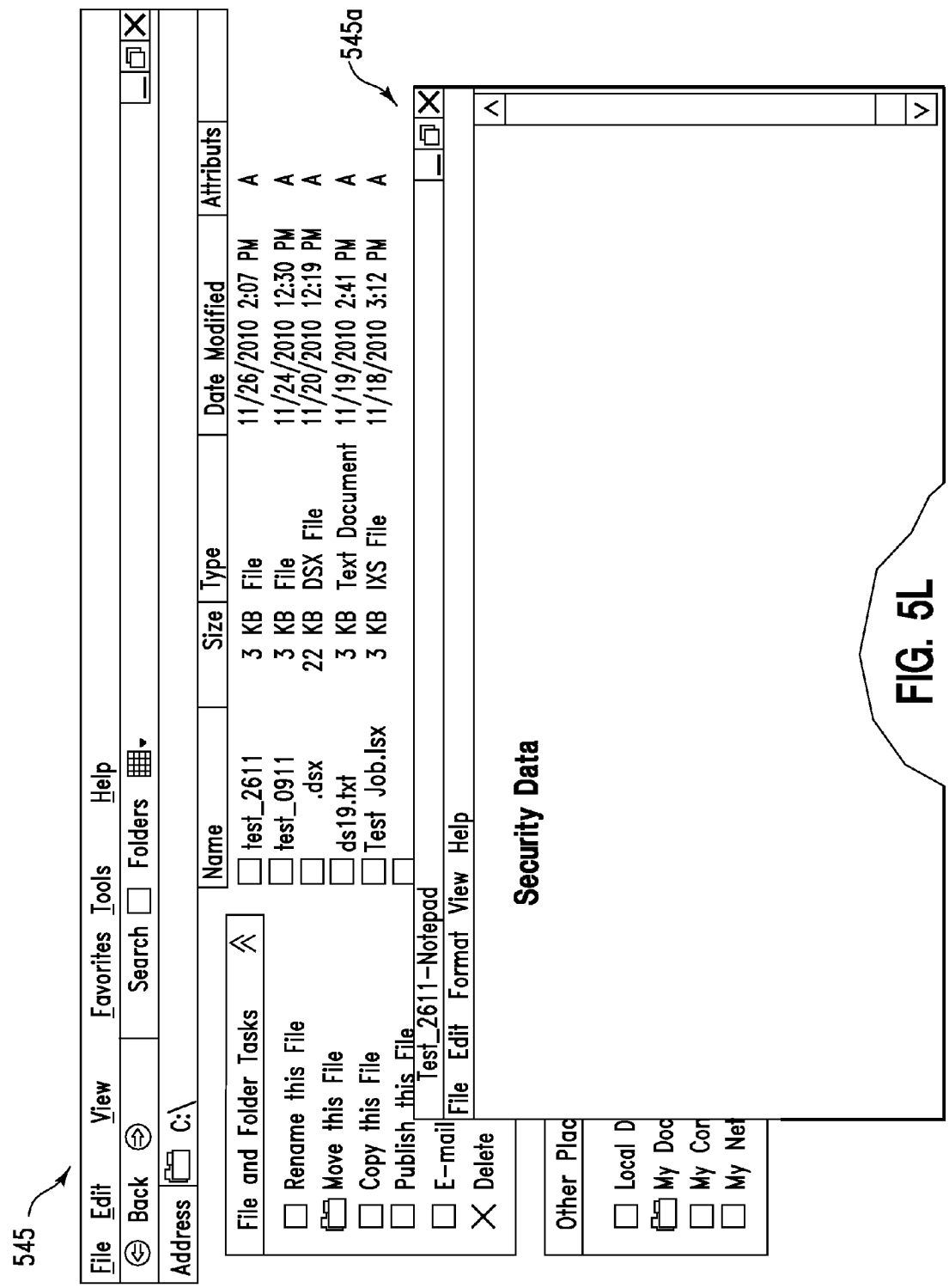

FIG. 5L illustrates a screen shot 545 associated with the implementation example described with respect to FIGS. 5A-5L. Screen shot 545 comprises a security screen 545a comprising security data. Screen shot 545 allows LSH security to be maintained while interacting with DS as DS provides an LSH username to be used for an interaction. During a DS job, LSH will perform the following process:

When the DS job is executed, LSH alters a password for the schema in which the tables reside and transmits the schema name and new password to an external system for access to the tables. When the job execution has been completed, the schema's password is reset to an original password as some external applications may store the user name and password passed in the log file for debug or audit purpose. When the LSH program is submitted successfully, it may be verified that data of the LSH table T_AE is written to the sequential file configured in the DS server as illustrated in DS job sequential file properties.

Figure 6:
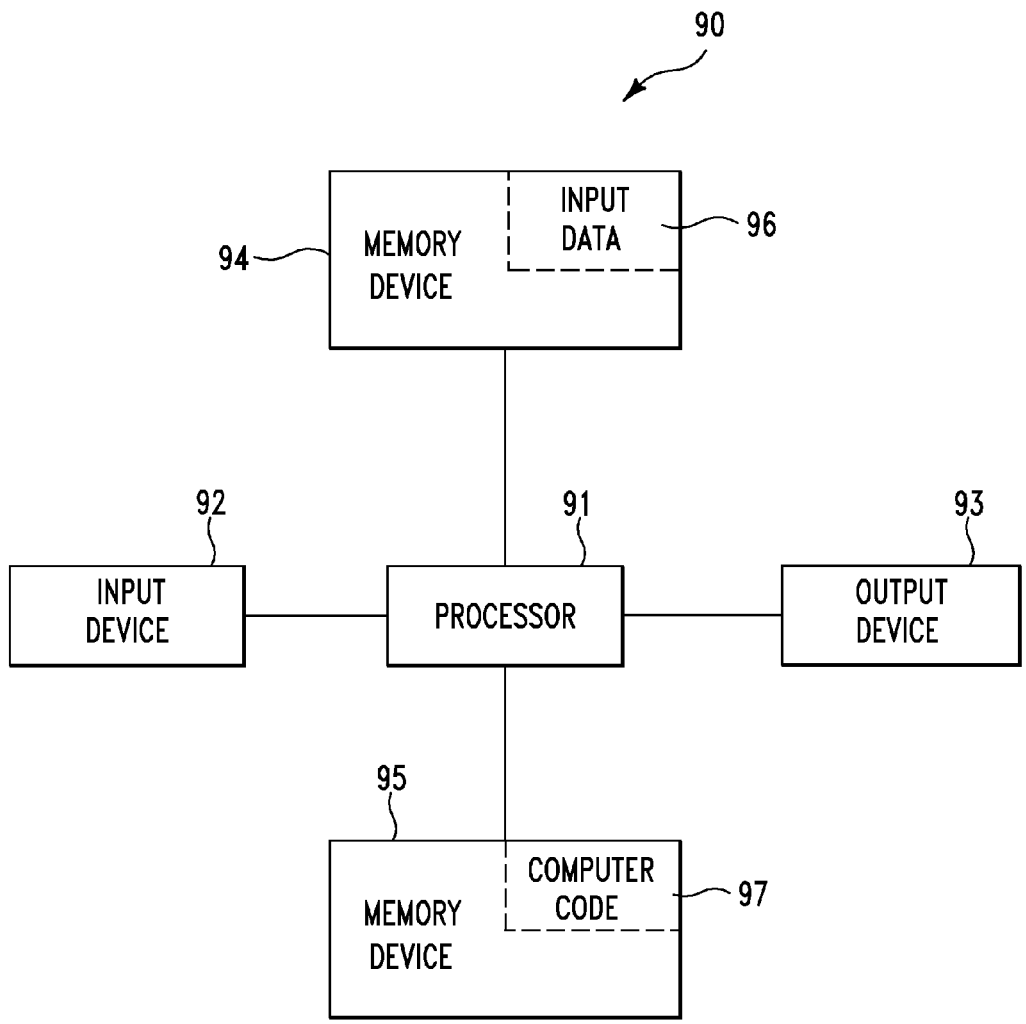
FIG. 6 illustrates a computer apparatus used for automating data analysis and transformation within a data hub, in accordance with embodiments of the present invention.

FIG. 6 illustrates a computer apparatus 90 used by system 100 of FIG. 1 for automating data analysis and transformation within a data hub, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4) for automating data analysis and transformation within a data hub. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to automate data analysis and transformation within a data hub. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for automating data analysis and transformation within a data hub. In another embodiment, the invention provides a business method that performs the process steps of the invention on a subscription, advertising, and/or fee basis. That is, a service supplier, such as a Solution Integrator, could offer to automate data analysis and transformation within a data hub. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
    linking, by a computer processor of a data hub, source tables and target tables to a data hub application configured to embed, extract, transform, and load (ETL) processes;
    associating, by said computer processor, said source tables and said target tables to a local sensitive hashing (LSH) program comprising target flags;
    transferring, by said computer processor, metadata associated with said source tables and said target tables from virtual views of said data hub application to an ETL work area of said ETL processes, wherein said metadata comprises table definition metadata published to a DS tool comprising said source tables and said target tables;
    linking, by said computer processor, ETL job to said data hub application;
    executing, by said computer processor executing a data hub scheduler application, said ETL processes;
    determining, by said computer processor, results of said executing, wherein said results indicate that said executing was not successful; and
    detecting and syncing, by said computer processor, changes to said metadata associated with job failure sensing, wherein said detecting and syncing comprises:
        analyzing, by said computer processor, a log file pattern indicating a reason that said executing was not successful;
        decoding, by said computer processor, said log file pattern;
        generating, by said computer processor, a change script based on a category of said log file pattern, wherein said change script comprises an exception routine associated with non-classified categories;
        notifying, by said computer processor, users of said changes to said metadata and said change script; and
        triggering, by said computer processor executing said change script, enabling updated changes to said metadata.

2. The method of claim 1, wherein said transferring said metadata comprises:
    transmitting, by said computer processor, an identifier for said data hub application to a utility program for performing said transferring.

3. The method of claim 1, wherein said executing comprises:

retrieving, by said computer processor, ETL job identifiers and runtime parameters.

4. The method of claim 1, further comprising:
providing, by said computer processor, a virtual view of a source system providing said source tables.

5. The method of claim 1, further comprising:
retrieving in parallel, by said computer processor from multiple entries of said source tables and said target tables, information.

6. The method of claim 1, further comprising:
managing in a regulated manner, by said computer processor, a flow of information within said data hub.

7. The method of claim 6, further comprising:
automatically managing, by said computer processor from said flow of information, said ETL processes.

8. The method of claim 1, further comprising:
providing a process for supporting computer infrastructure, said process comprising providing at least one support service for at least one of creating, integrating, hosting, maintaining, and deploying computer-readable code in the computing apparatus, wherein the code in combination with the computing apparatus is configured to perform the method of claim 1.

9. A data hub comprising a computer processor coupled to a computer-readable memory unit, said memory unit comprising instructions that when executed by the computer processor implements a method comprising:
linking, by said computer processor, source tables and target tables to a data hub application configured to embed, extract, transform, and load (ETL) processes;
associating, by said computer processor, said source tables and said target tables to a local sensitive hashing (LSH) program comprising target flags;
transferring, by said computer processor, metadata associated with said source tables and said target tables from virtual views of said data hub application to an ETL work area of said ETL processes, wherein said metadata comprises table definition metadata published to a DS tool comprising said source tables and said target tables;
linking, by said computer processor, ETL job to said data hub application;
executing, by said computer processor executing a data hub scheduler application, said ETL processes;
determining, by said computer processor, results of said executing, wherein said results indicate that said executing was not successful; and
detecting and syncing, by said computer processor, changes to said metadata associated with job failure sensing, wherein said detecting and syncing comprises:
analyzing, by said computer processor, a log file pattern indicating a reason that said executing was not successful;
decoding, by said computer processor, said log file pattern;
generating, by said computer processor, a change script based on a category of said log file pattern, wherein said change script comprises an exception routine associated with non-classified categories;
notifying, by said computer processor, users of said changes to said metadata and said change script; and
triggering, by said computer processor executing said change script, enabling updated changes to said metadata.

10. The data hub of claim 9, wherein said transferring said metadata comprises:
transmitting, by said computer processor, an identifier for said data hub application to a utility program for performing said transferring.

11. The data hub of claim 9, wherein said executing comprises:
retrieving, by said computer processor, ETL job identifiers and runtime parameters.

12. The data hub of claim 9, wherein said method further comprises:
providing, by said computer processor, a virtual view of a source system providing said source tables.

13. The data hub of claim 9, wherein said method further comprises:
retrieving in parallel, by said computer processor from multiple entries of said source tables and said target tables, information.

14. The data hub of claim 9, wherein said method further comprises:
managing in a regulated manner, by said computer processor, a flow of information within said data hub.

15. The data hub of claim 14, wherein said method further comprises:
automatically managing, by said computer processor from said flow of information, said ETL processes.

16. A computer program product, comprising a computer readable hardware storage device storing a computer readable program code, said computer readable program code comprising an algorithm that when executed by a computer processor of a data hub implements a method, said method comprising:
linking, by said computer processor, source tables and target tables to a data hub application configured to embed, extract, transform, and load (ETL) processes;
associating, by said computer processor, said source tables and said target tables to a local sensitive hashing (LSH) program comprising target flags;
transferring, by said computer processor, metadata associated with said source tables and said target tables from virtual views of said data hub application to an ETL work area of said ETL processes, wherein said metadata comprises table definition metadata published to a DS tool comprising said source tables and said target tables;
linking, by said computer processor, ETL job to said data hub application;
executing, by said computer processor executing a data hub scheduler application, said ETL processes;
determining, by said computer processor, results of said executing, wherein said results indicate that said executing was not successful; and
detecting and syncing, by said computer processor, changes to said metadata associated with job failure sensing, wherein said detecting and syncing comprises:
analyzing, by said computer processor, a log file pattern indicating a reason that said executing was not successful;
decoding, by said computer processor, said log file pattern;
generating, by said computer processor, a change script based on a category of said log file pattern, wherein said change script comprises an exception routine associated with non-classified categories;
notifying, by said computer processor, users of said changes to said metadata and said change script; and
triggering, by said computer processor executing said change script, enabling updated changes to said metadata.

17. The computer program product of claim 16, wherein said transferring said metadata comprises:
   transmitting, by said computer processor, an identifier for said data hub application to a utility program for performing said transferring.

18. The computer program product of claim 16, wherein said executing comprises:
   retrieving, by said computer processor, ETL job identifiers and runtime parameters.

19. The computer program product of claim 16, wherein said method further comprises:
   providing, by said computer processor, a virtual view of a source system providing said source tables.

20. The computer program product of claim 16, wherein said method further comprises:
   retrieving in parallel, by said computer processor from multiple entries of said source tables and said target tables, information.

* * * * *